(12) United States Patent
Chen et al.

(10) Patent No.: US 6,263,022 B1
(45) Date of Patent: *Jul. 17, 2001

(54) SYSTEM AND METHOD FOR FINE GRANULAR SCALABLE VIDEO WITH SELECTIVE QUALITY ENHANCEMENT

(75) Inventors: Yingwei Chen, Ossining, NY (US); Hayder Radha, Mahwah, NJ (US); Mihaela van der Schaar, Ossining, NY (US)

(73) Assignee: Philips Electronics North America Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,882

(22) Filed: Jul. 6, 1999

(51) Int. Cl.[7] .................................................. H04N 7/12
(52) U.S. Cl. ........................................................ 375/240.03
(58) Field of Search .................................... 348/397, 398, 348/405, 408; 375/240; 382/232

(56) References Cited

U.S. PATENT DOCUMENTS

| | | | |
|---|---|---|---|
| 5,321,776 | * | 6/1994 | Shapiro ................................ 348/384 |
| 5,481,308 | * | 1/1996 | Hartung et al. ..................... 348/398 |
| 5,604,602 | * | 2/1997 | Guillotel et al. .................... 348/398 |
| 5,742,892 | * | 4/1998 | Chaddha ............................. 348/398 |
| 5,767,966 | * | 6/1998 | Kondo et al. ....................... 358/428 |
| 5,929,912 | * | 7/1999 | Aono et al. ......................... 348/398 |
| 5,966,465 | * | 10/1999 | Keith et al. ........................ 382/232 |
| 6,097,842 | * | 8/2000 | Suzuki et al. ...................... 382/232 |

FOREIGN PATENT DOCUMENTS

WO9819273    7/1998 (WO) ............................ G06T/9/40

OTHER PUBLICATIONS

PHA 23,725, U.S. Serial No. 09/347,881, Filed: Jul. 6, 1999.

* cited by examiner

*Primary Examiner*—Chris Kelley
*Assistant Examiner*—Allen Wong
(74) *Attorney, Agent, or Firm*—Russell Gross (57) ABSTRACT

There is disclosed an adaptive quantization controller for use in a video encoder comprising a base layer circuit for receiving an input stream of video frames and generating compressed base layer video frames suitable for transmission to a streaming video receiver and an enhancement layer circuit for receiving the input stream of video frames and a decoded version of the compressed base layer video frames and generating enhancement layer video data associated with, and allocated to, corresponding ones of the compressed base layer video frames. The adaptive quantization controller receives at least one quantization parameter from the base layer circuit and, in response thereto, determines a corresponding shifting factor for shifting a bit plane associated with the enhancement layer video data. The adaptive quantizaion controller also modifies a data field in the enhancement layer video data to cause the video streaming receiver to assign a higher decoding priority to the shifted bit plane.

24 Claims, 3 Drawing Sheets

SYSTEM AND METHOD FOR FINE GRANULAR SCALABLE VIDEO WITH SELECTIVE QUALITY ENHANCEMENT

CROSS-REFERENCE TO RELATED APPLICATIONS

The present invention is related to that disclosed in U.S. patent application Ser. No. 09/347,881, entitled "SYSTEM AND METHOD FOR IMPROVED FINE GRANULAR SCALABLE VIDEO USING BASE LAYER CODING INFORMATION," which is being filed concurrently herewith and is commonly assigned co the assignee of the present invention. The disclosure of the related patent application is incorporated herein by reference for all purposes as if fully set forth herein.

TECHNICAL FIELD OF THE INVENTION

The present invention is directed, in general, to video encoding systems and, more specifically, to a system for encoding streaming video data.

BACKGROUND OF THE INVENTION

Real-time streaming of multimedia content over data networks, including the Internet, has become an increasingly common application in recent years. A wide range of interactive and non-interactive multimedia applications, such as news-on-demand, live network television viewing, video conferencing, among others, rely on end-to-end streaming video techniques. Unlike a "downloaded" video file, which may be retrieved first in "non-real" time and viewed or played back later in "real" time, streaming video applications require a video transmitter that encodes and transmits a video signal over a data network to a video receiver, which must decode and display the video signal in real time.

Scalable video coding is a desirable feature for many multimedia applications and services that are used in systems employing decoders with a wide range of processing power. Scalability allows processors with low computational power to decode only a subset of the scalable video stream. Another use of scalable video is in environments with a variable transmission bandwidth. In those environments, receivers with low-access bandwidth receive, and consequently decode, only a subset of the scalable video stream, where the amount of that subset is proportional to the available bandwidth.

Several video scalability approaches have been adopted by lead video compression standards such as MPEG-2 and MPEG-4. Temporal, spatial, and quality (e.g., signal-noise ratio (SNR)) scalability types have been defined in these standards. All of these approaches consist of a base layer (BL) and an enhancement layer (EL). The BL part of the scalable video stream represents, in general, the minimum amount of data needed for decoding that stream. The EL part of the stream represents additional information, and therefore enhances the video signal representation when decoded by the receiver.

For each type of video scalability, a certain scalability structure is identified. The scalability structure defines the relationship among the pictures of the BL and the pictures of the EL. One class of scalability is fine-granular scalability (FGS). Images coded with this type of scalability can be decoded progressively. In other words, the decoder can start decoding and displaying the image without the need for receiving all of the data used for coding that image. As more data is received, the quality of the decoded image is progressively enhanced until the complete information is received, decoded, and displayed.

The newly proposed MPEG-4 standard is directed to new video streaming applications based on very low bit rate coding, such as video-phone, mobile multimedia and audio-visual communications, multimedia e-mail, remote sensing, interactive games, and the like. Within the MPEG-4 standard, fine-granular scalability has been recognized as an essential technique for networked video distribution. FGS primarily targets applications where video is streamed over heterogeneous networks in real-time. It provides bandwidth adaptivity by encoding content once for a range of bit rates, and enabling the video transmission server to change the transmission rate dynamically without in-depth knowledge or parsing of the video bit stream.

Bitplane compression of digital signals is a popular coding method for many multimedia applications. In particular, bitplane coding of audiovisual signals enables progressive and scalable transmission of these signals. Typically, an audio or a visual signal undergoes some type of a transform, such as Discrete Cosine Transform (DCT) or Discrete Wavelet Transform (DWT) that convert spatial pixel data to frequency domain transform coefficients prior to bitplane coding. Next, each bitplane is scanned and coded starting with the most significant bit (MSB) representation of the signal and ending with the least significant bit (LSB) representation. Thus, if the transform coefficients are represented by n bits, there are n corresponding bitplanes to be coded and transmitted.

Depending on a fidelity criterion (e.g., maximum allowable distortion) or a bitrate budget constraint, the coding of the signal may stop at, or even within, any particular bitplane. This approach provides the progressive feature of bitplane compression, especially when the coding is taking place in real-time (i.e., at the same time the signal is being transmitted). For signals coded off-line or prior to transmission, bitplane coding results in an embedded and scalable bitstream. This enables the sender to stop the transmission of the stream at (or within) any bitplane in response, for example, to network conditions such as available bandwidth.

Consequently, bitplane compression, in general, provides a very fine granular scalability (FGS) coding of the signal. Depending on the particular method used for coding the bitplanes, this granularity could be as fine as a single bit or as coarse as an entire bitplane. Therefore, if a signal is bitplane coded using n planes and a total number of b bits, the resulting compressed stream could include anywhere between n and b progressive representations of the original signal embedded in that stream.

One implementation of the proposed FGS structure for MPEG-4 uses the current MPEG-4 video coding standard as the base layer (BL) encoding scheme and encodes the enhancement layer (EL) as the difference between the DCT coefficients of the original picture and the base layer reconstructed DCT coefficients. The enhancement encoding scans through the difference (or residual) DCT coefficients bit-plane by bit-plane, and encodes a series of 1's and 0's as a refinement of the base layer DCT coefficients.

The limitation of this implementation is that the enhancement layer encoder scans each individual residual DCT bit-plane from MSB to LSB, block by block. Therefore, there is no control by the encoder on which part or blocks of the residual signal should be better enhanced or given higher priority in the encoding process. In other words, the enhancement layer encoder does not control the distribution of compression artifacts throughout the enhanced picture. This major drawback leaves virtually no room for optimizing the enhancement layer encoder, which is highly desirable in designing video coding algorithms.

Another problem with the current FGS implementation is that its scalability is limited by the number of bit-planes of the residual DCT coefficients. One entire bit-plane has to be encoded in order to span the whole image, with no spatial skipping of visually less important information. By coding portions of one bit-plane ahead of the other, fewer bits are needed to span the whole image, and therefore more enhancement layers can be generated by better scalability.

In conventional motion-compensation DCT-based video coding algorithms, regional selective coding of pictures is usually realized through adaptive quantization of image blocks. The quantization step size for each block can vary according to encoding decisions and the step sizes are sent in the resulting bitstream. A special case or extension of adaptive quantization, known as region of interest (ROI) coding, exists in which the image may be segmented (or classified) into sub-regions with different levels of interest to potential viewers. The sub-regions are then coded with different levels of quality accordingly.

Both adaptive quantization and ROI have been proposed in the past and are now used in various coding standards and algorithms. For example, all MPEG (MPEG-1, MPEG-2, and MPEG-4) video coding standards allow various degrees of adaptive quantization. ROI coding of video or still images realized through bit-plane shifting also exists. However, in the context of FGS, the enhancement layer is currently coded with no hierarchy of quality importance in the picture.

There is therefore a need in the art for improved encoders and encoding techniques for use in streaming video systems. In particular, there is a need for encoders and encoding techniques that take into consideration visual characteristics of an image when encoding the image. More particularly, there is a need for encoders and encoding techniques that selectively enhance parts or blocks of the residual signal that have been given a higher priority in the encoding process.

SUMMARY OF THE INVENTION

To address the above-discussed deficiencies of the prior art, it is a primary object of the present invention to provide an adaptive quantization controller for use in a video encoder comprising: 1) a base layer circuit capable of receiving an input stream of video frames and generating therefrom compressed base layer video frames suitable for transmission at a base layer bit rate to a streaming video receiver, and 2) an enhancement layer circuit capable of receiving the input stream of video frames and a decoded version of the compressed base layer video frames and generating therefrom enhancement layer video data associated with, and allocated to, corresponding ones of the compressed base layer video frames. The adaptive is quantization controller is capable of receiving at least one quantization parameter from the base layer circuit and, in response thereto, determining a corresponding shifting factor for shifting at least one bit plane associated with the enhancement layer video data and modifying a data field in the enhancement layer video data to cause the video streaming receiver to assign a higher decoding priority to the shifted at least one bit plane.

According to one embodiment of the present invention, the at least one bit plane comprises an N×M block of the enhancement layer video data.

According to another embodiment of the present invention, the adaptive quantization controller modifies the data field to include the shifting factor and a mode indicator indicating that the shifting factor corresponds to the N×M block of the enhancement layer video data.

According to still another embodiment of the present invention, the shifting factor is in the range from 0 to 2 bit planes.

According to yet another embodiment of the present invention, the at least one bit plane comprises a plurality of is related N×M blocks of the enhancement layer video data.

According to a further embodiment of the present invention, the adaptive quantization controller modifies the data field to include the shifting factor and a mode indicator indicating that the shifting factor corresponds to the plurality of N×M blocks of the enhancement layer video data.

According to a still further embodiment of the present invention, the shifting factor is in the range from 0 to 7 bit planes.

According to a yet further embodiment of the present invention, the adaptive quantization controller modifies the data field to include a mode indicator indicating that no bit plane associated with the enhancement layer video data is being shifted.

The foregoing has outlined rather broadly the features and technical advantages of the present invention so that those skilled in the art may Letter understand the detailed description of the invention that follows. Additional features and advantages of the invention will be described hereinafter that form the subject of the claims of the invention. Those skilled in the art should appreciate that they may readily use is the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may he implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
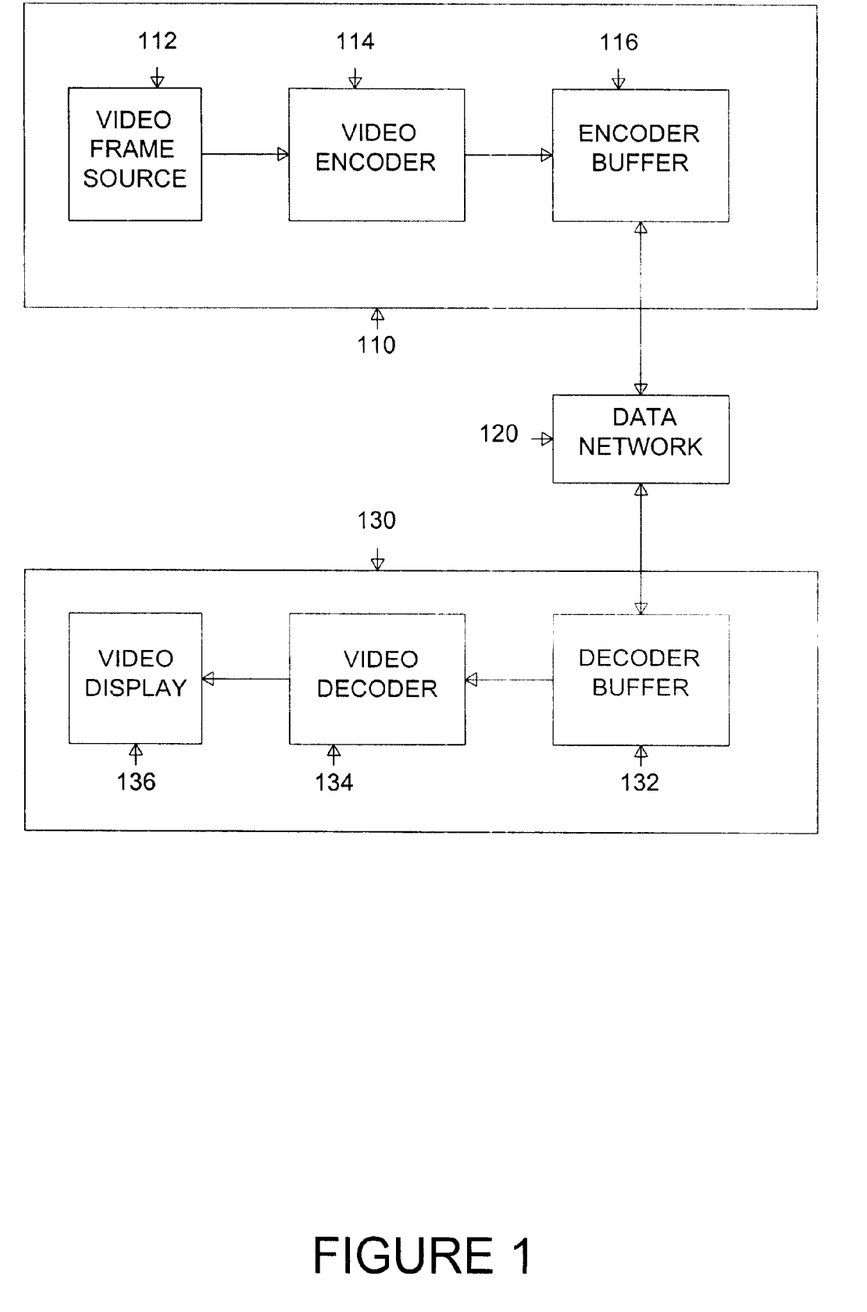
FIG. 1 illustrates an end-to-end transmission of streaming video from a streaming video transmitter through a data network to a streaming video receiver, according to one embodiment of the present invention.
Figure 2:
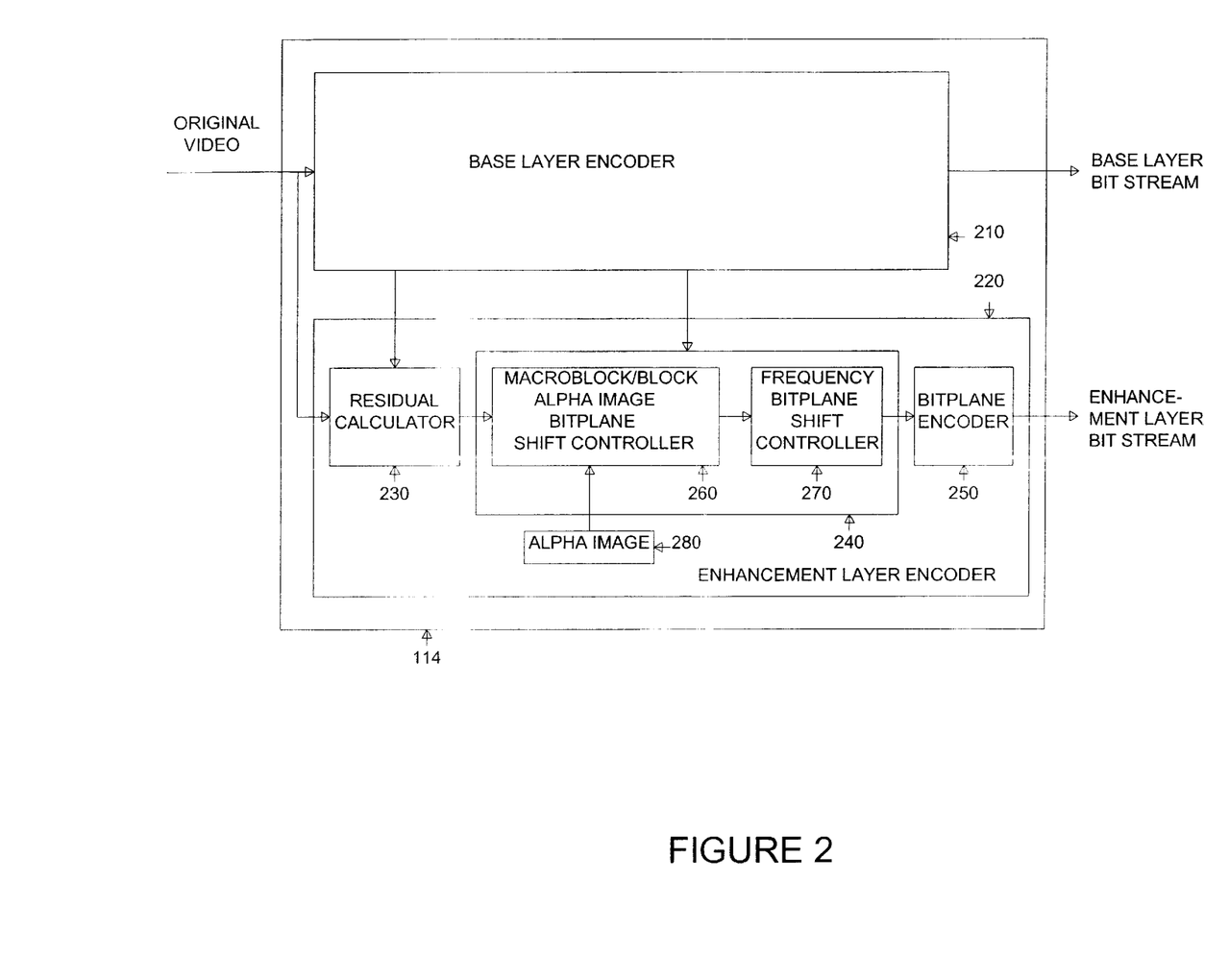
FIG. 2 illustrates exemplary video encoder 114 in accordance with one embodiment of the present invention.
Figure 3:
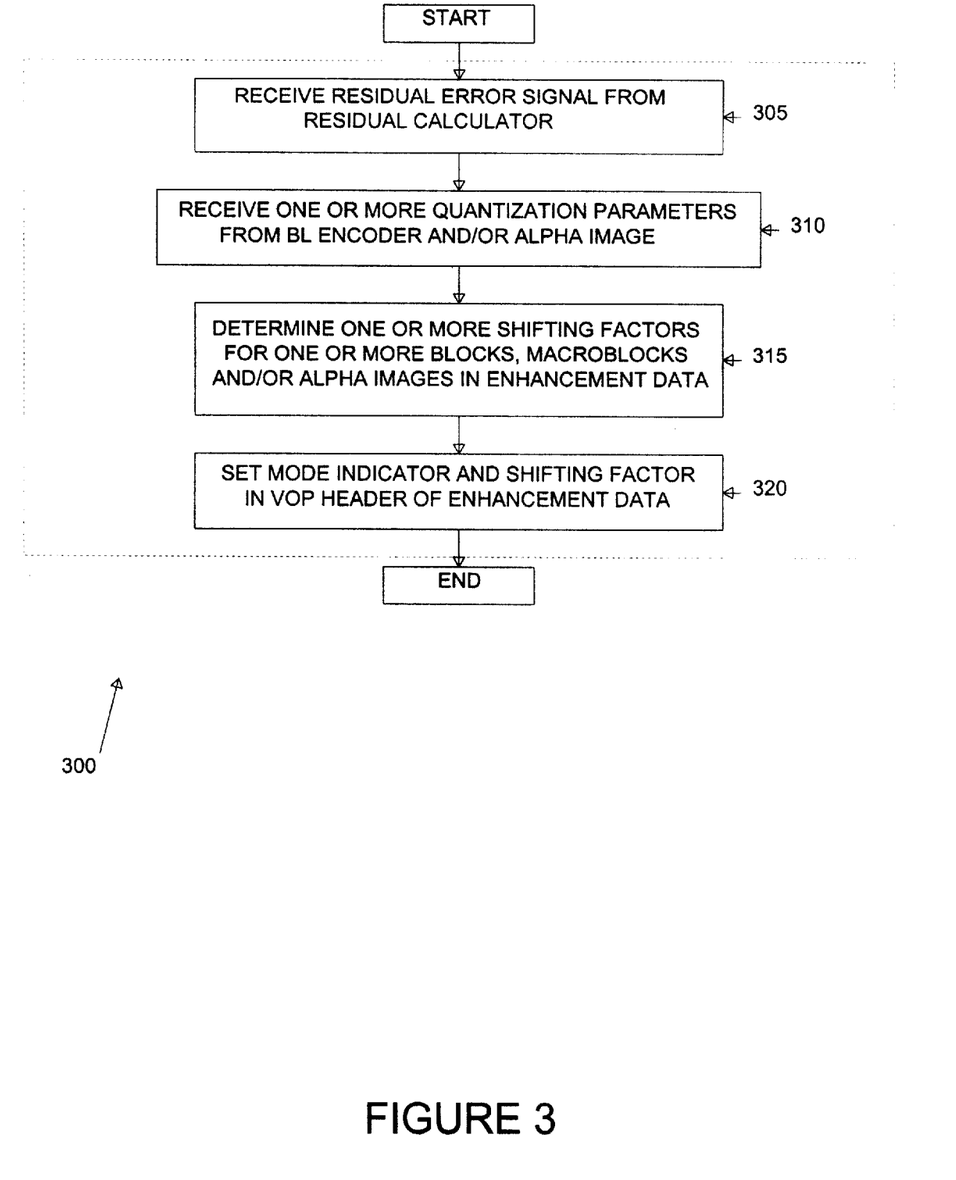
FIG. 3 is a flow diagram illustrating the operation of an exemplary adaptive quantization controller in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video encoder.

FIG. 1 illustrates an end-to-end transmission of streaming video from streaming video transmitter 110 through data network 120 to streaming video receiver 130, according to one embodiment of the present invention. Depending on the application, streaming video transmitter 110 may be any one of a wide variety of sources of video frames, including a data network server, a television station, a cable network, a desktop personal computer (PC), or the like.

Streaming video transmitter 110 comprises video frame source 112, video encoder 114 and encoder buffer 116. Video frame source 112 may be any device capable of generating a sequence of uncompressed video frames, including a television antenna and receiver unit, a video cassette-player, & video camera, a disk storage device capable of storing a "raw" video clip, and the like. The uncompressed video frames enter video encoder 114 at a given picture rate (or "streaming rate") and are compressed according to any known compression algorithm or device, such as an MPEG-4 encoder. Video encoder 114 then transmits the compressed video frames to encoder buffer 116 for buffering in preparation for transmission across data network 120. Data network 120 may be any suitable IP network and may include portions of both public data networks, such as the Internet, and private data networks, such as an enterprise-owned local area network (LAN) or wide area network (WAN).

Streaming video receiver 130 comprises decoder buffer 132, video decoder 134 and video display 136. Decoder buffer 132 receives and stores streaming compressed video frames from data network 120. Decoder buffer 132 then transmits the compressed video frames to video decoder 134 as required. Video decoder 134 decompresses the video frames at the same rate (ideally) at which the video frames were compressed by video encoder 114. Video decoder 134 sends the decompressed frames to video display 136 for play-back on the screen of video display 134.

FIG. 2 illustrates exemplary video encoder 114 in accordance with one embodiment of the present invention. Video encoder 114 comprises base layer (EL) encoder 210 and enhancement layer (EL) 220. BL encoder 210 receives from video frame source 112 image frames from an original video signal and, through a series of well-known motion estimation, quantization and frequency domain transformation (e.g., discrete cosine transform (DCT)) processes, compresses the frames to produce a base layer bit stream that is sent to encoder buffer 116. The base layer bit stream is frequently sized to match the guaranteed minimum transmission rate through data network 120. In other words, if streaming video transmitter 110 is guaranteed, for example, a 128 kbps service connection through data network 120, then the base layer bit stream at the output of BL encoder 210 transmits at 128 kbps. The compression of the original video frames in BL encoder 210 is a "lossy" process: the frames that are decompressed and reconstructed by video decoder 134 using just the base layer bit stream are of poorer quality than the original video frames.

If data network 120 provides greater than the minimum transmission bandwidth, the quality of the decompressed and reconstructed frames may be improved using the enhancement layer bit stream produced by EL encoder 220. EL encoder 220 comprises residual calculator 230, adaptive quantization controller 240, and bit plane controller 250. Adaptive quantization controller 240 further comprises macroblock/block/alpha image (MBA) bitplane shift controller 260 and frequency bitplane shift controller 270. Residual calculator 230 in EL encoder 220 receives from video frame source 112 image frames from the original video signal and receives from BL encoder 210 decompressed frames derived from the compressed video frames transmitted in the base layer bit stream. Using these inputs, residual calculator 230 produces a residual signal representing image information missing in the base layer frames as a result of the transform and quantization processes. The output of residual calculator 230 is commonly referred to as the residue, the residual signal, or residual error data.

In accordance with the principles of the present invention, adaptive quantization controller 240 receives the residue signal and one or more quantization parameters from BL encoder 210 and MBA bitplane shift controller 260 performs bitplane shifting on blocks or groups of blocks, called "macroblocks" in the residual signal, as described below in greater detail. MBA bitplane shift controller 260 may also perform bitplane shifting on an arbitrarily shaped block, referred to as alpha image 280, if it is available in video encoder 114. Optionally, frequency bitplane shift controller 270 may perform bitplane shifting of frequency domain coefficients (e.g., DCT coefficients). Finally, the bitplane shifted data in the residue signal is encoded in bitplane encoder 250 to produce the data of the enhancement layer bit stream.

The present invention introduces systems and methods by which quality selective encoding can be performed during enhancement layer encoding, and by which the enhancement bits are organized not only spatially, but also in the order of decreasing visual importance. The present invention accomplishes the foregoing using two different techniques. The first technique is by introducing a shifting factor of bit-planes to each macroblock (a group of blocks) or variable-size block (e.g., 4×4 or 8×8 block) . The shifting factor acts similarly to the quantization step size used in the base layer. It shifts the bit-planes up or down, depending on the sign of the shifting factor.

Co-pending U.S. patent application Ser. No. 09/347,881, filed Jul. 6, 1999, entitled "SYSTEM AND METHOD FOR IMPROVED FINE GRANULAR SCALABLE VIDEO USING BASE LAYER CODING INFORMATION," discloses systems and method for monitoring one or more base layer parameters (or quantization parameters) that can be used to identify blocks or macroblocks that are visually more important than other blocks or macroblocks, such as by identifying blocks or macroblocks that have high levels of activity between frames, high quantization errors, and the like. If a macroblock or block is identified as being more visually important by the base layer quantization parameters or some other criteria, then the bit-planes of the identified macroblock or block can be shifted up by adaptive quantization controller 240. The bit-planes of the upwardly shifted macroblock or block can be coded with higher priority than the same bit-planes of the other data units. This macroblock/block level of shifting achieves local control of quantization and, hence, improves visual quality. The term "shifting unit" is used hereafter to refer to the set of data governed by one shifting factor.

Since sending shifting factors at the shifting-unit level incurs overhead in the bitstream, adaptive quantization controller 240 provides an efficient mechanism for minimizing the amount of overhead needed. Adaptive quantization controller 240 achieves this efficiency in a number of ways, including:

1. In one fine-granular scalability (FGS) embodiment of the present invention, there is a flag at the beginning of each block to indicate if the current bit-plane of the whole block is zero or not. If this flag is 0, then adaptive quantization controller 240 does not send the shifting factor, 0's don't contribute to reconstruction of the block.

2. In one embodiment of the present invention, quantization controller 240 limits the range of shifting factors (e.g., between 0 and 3). If fixed-length code is used to send this shifting factor, then only 2 bits are needed per shifting unit. Variable-length code (VLC) can also be designed to further reduce the amount of overhead.

3. In one embodiment of the present invention, adaptive quantization controller 240 codes the differentiation signal of the shifting factors, instead of the shifting factors themselves. This saves on overhead if the shifting factors don't change by large amounts from unit to unit.

4. If the shifting factors are determined solely as a function of the base layer video and other non-enhancement data related information, then the decoder can repeat the determination process and derive the shifting factors used on the encoder side. In this scenario, the shifting factors need not to be sent at all.

5. For a video object with an arbitrarily shaped region, each video frame has a corresponding "alpha image" that defines the shape of the object within that particular video frame. In one embodiment of the present invention, adaptive quantization controller 240 uses the alpha image, which defines the shape of the object, as a guidance for the location and amount of bit-plane shifting. There are two types of alpha images: binary and graylevel. For a binary alpha image, each "alpha-pixel" can take a value of 1 or 0. Typically, a 1 indicates that the corresponding pixel is within the video object. Therefore, if adaptive quantization controller 240 has access to the alpha image of a video object, then adaptive quantization controller 240 can perform shifting only on the pixels within the video object. If the decoder also has access to the alpha image (i.e., the shape information is conveyed to the decoder by some means), then adaptive quantization controller 240 does not need to send the overhead information needed for identifying the pixels that are being bit-plane shifted.

For graylevel alpha images, each alpha pixel can have a range of possible values (e.g., 0–255). In this case, adaptive quantization controller 240 may use the alpha value of each pixel as a guide to deciding the amount of bit-plane shifting that adaptive quantization controller 240 should apply to that particular pixel. For example, encoder 114 may perform a larger number of bit-plane shifts for pixels with higher alpha values. However, the inverse may also apply (i.e., the higher the alpha value the less bit-plane shifting), depending on the semantics of the alpha value and whether encoder 114 is emphasizing the is video object under consideration, the background, or other video objects in the same scene. Similar to the binary alpha-image case, if adaptive quantization controller 240 has access to the graylevel alpha image, then adaptive quantization controller 240 does not need to transmit the extra overhead needed to convey information regarding the amount of bit-plane shifting that took place.

The second technique for achieving selective quality enhancement is to introduce bit-plane shifting in the DCT coefficient domain. There are 64 DCT coefficients in an 8×8 block, and each DCT coefficient can have different contribution to the end visual quality of the coded image. Introducing a matrix of shifting factors for all 64 DCT coefficients enables adaptive quantization controller 240 to selectively code different DCT coefficients differently throughout the whole image. An exemplary shifting matrix is illustrated below.

$$\begin{matrix} 1 & 2 & 3 & 3 & 4 & 4 & 4 & 4 \\ 2 & 2 & 3 & 3 & 4 & 4 & 4 & 4 \\ 3 & 3 & 3 & 3 & 4 & 4 & 4 & 4 \\ 3 & 3 & 3 & 3 & 4 & 4 & 4 & 4 \\ 4 & 4 & 4 & 4 & 4 & 4 & 4 & 4 \\ 4 & 4 & 4 & 4 & 4 & 4 & 4 & 4 \\ 4 & 4 & 4 & 4 & 4 & 4 & 4 & 4 \\ 4 & 4 & 4 & 4 & 4 & 4 & 4 & 4 \end{matrix}$$

The combination of spatial and frequency-domain shifting factors gives adaptive quantization controller 240 much flexibility in the encoding process, and leaves much room for encoder optimization to achieve better visual quality under the same rate constraint.

The present invention proposes syntax for adaptive quantization as a mechanism to enhance the quality of the FGS scheme. Adaptive quantization has already been adopted for the MPEG-4 base-layer. Applying this mechanism at the enhancement layer is also important, since FGS targets a range of lower bit-rates that may particularly benefit from a differentiated bit-allocation to enhance specific objects or reduce flickering effects introduced by the intra-frame coding of FGS.

Adaptive quantization controller 240 may perform adaptive quantization in the enhancement layer in three distinct modes:

1. No adaptive quantization.
2. Adaptive quantization at the macroblock-level, employing differential coding between the adaptive quantization parameters of adjacent macroblocks and a shifting factor range from 0 to 7.
3. Adaptive quantization at the block-level employing coding of quantization parameters (shifting factors) in the range of from 0 to 2.

Adaptive quantization controller 240 switches among the three modes at the video object plane (VOP) level, by adding a 2-bit flag to the VOP header. Providing these three different options is extremely important, since each mode offers a different trade-off between the amount of overhead and flexibility of the FGS encoder. In the remainder of this disclosure, adaptive quantization of the enhancement layer data shall be referred to as simply "adaptive quantization." When the adaptive quantization of the base-layer is being described, it shall be explicitly stated.

Adaptive Quantization for Fine-Granular Scalability
A. Simple Bit-Plane Shifting For adaptive quantization with respect to a particular (encoder defined) statistical or psycho-visual metric, the coefficients of each unit (block or macroblock) can be quantized differently. Adaptive quantization of the FGS residual can be implemented very efficiently by shifting tile various bit-planes of the residual upwards. This upward bit-plane shifting allows for relative quantization by factors of 2. For example, a shifting factor of 1 represents a multiplication of the residual coefficients by 2 and, hence, a reduction by half of the effective quantization step size. Similarly, a shifting factor of 2 means a multiplication by 4, and so on. By shifting the various coefficients upwards, the coefficients become significant prior to other less upwardly shifted or non-shifted coefficients. Therefore, the reconstruction error of the upwardly shifted coefficients is reduced (i.e., their quality is enhanced) compared to flat coding or no adaptive quantization at the same bit rates.

In implementing an adaptive quantization scheme for FGS, two degrees of freedom exist:
1. the range of adaptiveness, translated into the range of shifting factors.
2. the local granularity of quantization adaptivity (i.e., block vs. macroblock-based adaptive quantization).

When adaptive quantization controller 240 chooses an adaptive quantization scheme, a trade-off is be made between more flexibility and increased transmission overhead. The various options in this tradeoff are described next.

B. Macroblock vs. Block Adaptivity

For the MPEG-4 base-layer, adaptive quantization is performed at the macroblock level. For the FGS enhancement layer, block-level adaptive quantization by adaptive quantization controller 240 incurs six times the amount of overhead as adaptive quantization at the macroblock level for losslessly encoded bitstreams. However, the advantage of employing a block-based adaptive quantization resides in a more accurate adaptation, which is extremely important for images at low-resolutions.

In addition, the factor of six in increased overhead applies only to the whole FGS bitstream. In real applications, transmission of shifting factors may be delayed until the particular block becomes significant, as indicated by a one-bit flag at the block level. Therefore, block-based adaptive quantization gives better flexibility than macroblock-based adaptive quantization, at the expense of modestly increased overhead for practical applications. Detailed overhead analysis is given below.

Delayed Transmission of Shifting Factors for Block-based Adaptive Quantization

In the implementation of FGS residual coding, the residual signal of a particular block is added to the base-layer only when that block becomes significant. If no coefficient is significant yet, no residual signal is added to the base-layer of that block. Therefore, adaptive quantization controller 240 immediately sends the shifting factor for a block when that block becomes significant.

Hence, adaptive quantization controller 240 performs the comparison of overhead incurred by block- vs. macroblock-level adaptive quantization at a range of enhancement layer bit rates. One important factor used by adaptive quantization controller 240 is the number of transmitted shifting factors for the range of bit rates concerned.

For example, the two most significant bits (MSBs) of the enhancement layer usually span the enhancement rates 2× to 3×. The number of blocks and macroblocks which do not require (class 1) and do require (class 2) transmission of the shifting factor in this rate range are presented below in Tables 1 and 2, for the first and the second bit-planes of the residual signal, respectively. The numbers indicated in Tables 1 and 2 represent the worst case scenario, where all blocks have the same shifting factor. In this worst case, the transmission of fewer shifting factors are delayed, as compared to the case where only a few blocks are shifted up.

Class 1

The blocks or macroblocks which do not require shifting factor transmission can be classified into two sub-categories:
a) insignificant until and including the current bit-plane (no shifting factor required): $N_1$, $N^{MB}_1$;
b) already significant (the shifting factor has already been transmitted): $N_2$, $N^{MB}_2$.

Class 2

The blocks or macroblocks demanding shifting factor transmission in the current bit-plane are those becoming significant during the current bit-plane (last column of the tables) : $N_3$, $N^{MB}_3$.

Total number of blocks per frame $N=N_1+N_2+N_3$.

Total number of macroblocks per frame $=N^{MB}_1+N^{MB}_2+N^{MB}_3$.

TABLE 1

Classification of blocks (macroblocks) for first bit-plane, averaged over 100 frames.

| Sequence | #Zero blocks $N_1$ (#Zero MBs $N^{MB}_1$) | #Non-zero blocks $N_2$ (#Non-zero MBs $N^{MB}_2$) w/shifting factor already transmitted | #Non-zero blocks $N_3$ (#Non-zero MBs $N^{MB}_3$) w/shifting factor transmitted in this bp |
| --- | --- | --- | --- |
| Coastguard | 2081 (258) | 0 (0) | 295 (138) |
| Foreman | 1823 (190) | 0 (0) | 553 (206) |

TABLE 2

Classification of blocks (macroblocks) for second bit-plane, averaged over 100 frames.

| Sequence | #Zero blocks $N_1$ (#Zero MBs $N^{MB}_1$) | #Non-zero blocks $N_2$ (#Non-zero MBs $N^{MB}_2$) w/shifting factor already transmitted | #Non-zero blocks $N_3$ (#Non-zero MBs $N^{MB}_3$) with shifting factor transmitted in this bp |
| --- | --- | --- | --- |
| Coastguard | 1136 (31) | 295 (138) | 945 (227) |
| Foreman | 889 (39) | 553 (206) | 934 (151) |

From Tables 1 and 2, it becomes clear that the overhead required for block-based adaptive quantization is about 2–times larger than for macroblock-based quantization if the same shifting factors are employed for all blocks/macroblocks and delayed transmission of shifting factors is employed.

However, in practical adaptive quantization scheme, only a limited number of blocks/macroblocks will be shifted upwards: about 30% of the exemplary "Foreman" sequence and about 15% for the exemplary "Coastguard" sequence. In the extreme case, if all blocks or macroblocks are shifted up, then the advantages of adaptive quantization are negated. Therefore, the number of blocks and macroblocks in class 2 decreases even further and so does the additional overhead caused by block-level adaptive quantization. Moreover, the shifting factors account for only a small fraction of the overall bit-budget (e.g., less than 10%) of the bit-budget if $R_{EL}=R_{BL}$). The percentage of overhead decreases as the enhancement layer rate increases.

Tables 1 and 2 also reveal the importance of the conditional (or delayed) shifting factor transmission described below. Since the ratio between zero and non-zero blocks in the first bit-plane is very high, transmitting the shifting factors unconditionally would result in a considerable increase in overhead. In the macroblock-based approach, delaying transmission of the shifting factor until the whole macroblock becomes significant results in less than a 400-bit savings on overhead for the first bit-plane. This translates into negligible PSNR improvement (0.05 dB) for 12,800 bits per enhancement frame for the Foreman sequence. Therefore, in an advantageous embodiment of the present invention, adaptive quantization controller 240 uses conditional transmission of shifting factors only in the block case.

Range of Shifting Factors for Block-Based Adaptive Quantization

To further reduce the overhead caused by the transmission of shifting factors in block-level adaptive quantization, adaptive quantization controller 240 limits the shifting factors to a range between 0 and 2. The rationale behind this may be illustrated through typical adaptive quantization schemes for MPEG-2. In MPEG-2, the quantization step sizes vary in the range of one-half to two times the average step size if the only concern is image quality. However, MPEG-2 and MPEG-4 base layers allow a bigger range (1 to 31) of quantization step size for the purpose of facilitating buffer control. However, buffer control is not a consideration in FGS encoding due to its inherent buffer adaptiveness.

C. Fixed- vs. Variable-length Coding of Shifting Factors

Block-based Adaptive Quantization

For the transmission of shifting factors, adaptive quantization controller 240 may use either a fixed or variable-length coding, as illustrated below in Tables 3 and 4. For variable-length coding, the smallest codeword was assigned to the 0-shifting factor, since most blocks will not be shifted (i.e., 0 has the highest probability).

TABLE 3

Fixed-length representation of block shifting factor.

| Shifting factor | Binary representation |
| --- | --- |
| 0 | 00 |
| 1 | 01 |
| 2 | 10 |

TABLE 4

Variable-length coded representation of block shifting factor.

| Shifting factor | Binary representation |
| --- | --- |
| 0 | 0 |
| 1 | 10 |
| 2 | 11 |

Since conditional transmission of shifting factors is employed for the block-based approach, a differential coding of the shifting factors would not be appropriate since the adjacent shifting factors of most blocks will be missing (the blocks are still insignificant or will become significant later). This is a very important observation since it implies that differential coding should not be used in conjunction with the conditional shifting factor transmission.

The shifting range for the block-based approach cannot be extended beyond 0–2 without introducing an unacceptable overhead for adaptive quantization.

Macroblock-based Adaptive Qantization

1. Maximum Shifting Factor of Seven (7)

If a maximum shifting factor of seven (7) is employed, and the variation between two adjacent macroblocks is limited to +1, 0, or −1, then the variable length coding (VLC) in Table 5 may be followed by adaptive quantization controller 240. However, the differential coding of shifting factors is beneficial only when unconditional shifting factor transmission is utilized.

The absolute value of the shifting factor for the first macroblock in each slice still needs to be sent, either VLC or FLC coded.

TABLE 5

Variable-length coded representation of differential shifting factor coding.

| Relative shifting factor | Binary representation |
| --- | --- |
| 0 | 0 |
| 1 | 10 |
| −1 | 11 |

2. Maximum Shifting Factor of 2

If the range of bit-plane shifting is limited between 0 and 2, then adaptive quantization controller 240 may transmit the absolute values of the shifting factors instead of the differential method described above. The corresponding VLC-table is presented below in Table 6.

From the coding perspective, this method has one advantage and one disadvantage with respect to the differential method. If absolute shifting factors are coded, then conditional transmission may be employed, thereby saving on overhead. However, the probability of having a 0 differential shifting factor is higher than having a 0 absolute value. Therefore, the VLC codes in Table 5 are more efficient than those in Table 6.

TABLE 6

Variable-length coded representation of absolute block shifting.

| shifting factor | Binary representation |
| --- | --- |
| 0 | 0 |
| 1 | 10 |
| 2 | 11 |

From the flexibility perspective, differential coding with an absolute range between 0 and 7 allows a bigger range of shifting factors, but limits the variation of shifting factors between adjacent macroblocks.

Table 7 summarizes the various modes used by adaptive quantization controller 240 for FGS adaptive quantization in the enhancement layer. It is noted that since Table 4 and 5 employ the same variable-length codes, the VLC table for adaptive quantization can be implemented as depicted in Table 8, thereby avoiding the higher complexity associated with multiple Huffman tables.

TABLE 7

Adaptive quantization modes.

| No. | AQ-mode (VOP level) | Shifting range | Level of Control | VLC codes for Shifting factors |
|---|---|---|---|---|
| 0 | 00 | N/A | N/A | N/A |
| 1 | 01 | 0–7 | Macroblock-level | Table 8 |
| 2 | 10 | 0–2 | Block-level | Table 8 |

TABLE 8

Variable-length coded representation of shifting factors.

| Differential shifting factor for macroblock-based AQ | Shifting factors for block-based AQ | Binary representation (Huffman codes) |
|---|---|---|
| 0 | 0 | 0 |
| 1 | 1 | 10 |
| −1 | 2 | 11 |

An exemplary syntax for adaptive quantization in video decoder 134 implemented by bit shifting is described below. It is noted that, while the bit-planes are shifted only upwards in video encoder 114, the bit-planes are shifted only downwards in video decoder 134. This may be implemented with the function "shifter_down", which takes the 64 reconstructed residual values (absolute values) of a block and the decoded shifting factor and performs the shifting.

Void shifter_down(Int diff[64], Int shift_factor)
{Int i;
    if (shift_factor>0) /*if there is any shifting to be done, shift_factor=0 means no shifting*/
        for (i=0; i<64; i++) diff[i]=diff[i]>> shift$_{\_factor;}$}

Also, throughout the whole FGS coding process, where the maximum number of bit-planes for the residual signal is set to N (e.g., in the current FGS reference software N=12), N becomes N+Max_shifting_factor (e.g., N=12+2 =14). The shifting of the planes upwards takes place in video encoder 114 after the reconstruction of the residual values from the decoded bit-planes.

FIG. 3 depicts flow diagram 300, which illustrates an exemplary operation of adaptive quantization controller 240 in accordance with one embodiment of the present invention. Initially, adaptive quantization controller 240 receives the residual error signal from residual calculator 230 (process step 305). Adaptive quantization controller 240 also receives from BL encoder 210 one or more quantization parameters associated with the residual error signal. Optionally, adaptive quantization controller 240 may receive (from BL encoder 210 or elsewhere) an alpha image associated with an arbitrarily shaped object in the base layer data (process step 310). Using the quantization parameters and/or the alpha image data, adaptive quantization controller 240 determines one or more shifting factors associated with the one or more bit planes in the enhancement layer data (process step 315). Finally, adaptive quantization controller 240 sets a mode indicator in, for example, the VOP header of the enhancement layer data indicating whether the shifting factor applies to a block or macroblock in the enhancement layer data (process step 320). The shifting factor itself is included in the VOP header to indicate the amount of shift to be applied to the block or macroblock in the enhancement layer data.

On the receiver side, video decoder 134 in streaming video receiver 130 comprises video processing circuitry capable of receiving the compressed base layer video frames and the enhancement layer video data that is associated with corresponding compressed base layer video frames. In one embodiment of the present invention, the video processing circuitry in video decoder 134 detects the shifting factor and/or the mode flag inserted in the VOP header of the enhancement layer video data by video encoder 114. In response to this detection, video decoder 134 assigns a higher decoding priority to the bit planes associated with the block, macroblock, or alpha image indicated by the mode flag and shifting factor.

In an alternate embodiment of the present invention, the video processing circuitry in video decoder 134 is capable of independently determining the adaptive quantization factors to be applied to the enhancement layer data. In such an embodiment, adaptive quantization is inferred by video decoder 134. Since video decoder 134 receives the same compressed base layer video frames that are generated by video encoder 114, video decoder 134 may be synchronized with video encoder 114 and apply the same adaptive quantization steps to the enhancement layer data, without explicit instructions from video encoder 114.

Although the present invention has been described in detail, those skilled in the art should understand that they can make various changes, substitutions and alterations herein without departing from the spirit and scope of the invention in its broadest form.

What is claimed is:

1. For use in a video encoder comprising: 1) a base layer circuit capable of receiving an input stream of video frames and generating therefrom compressed base layer video frames suitable for transmission to a streaming video receiver, and 2) an enhancement layer circuit capable of receiving said input stream of video frames and a decoded version of said compressed base layer video frames and performing bit-plane coding to generate therefrom enhancement layer video data associated with, and allocated to, corresponding ones of said compressed base layer video frames, an adaptive quantization controller capable of receiving at least one quantization parameter from said base layer circuit and, in response thereto, determining a corresponding shifting factor for shifting at least one bit plane associated with said enhancement layer video data and modifying a data field in said enhancement layer video data to cause said video streaming receiver to assign a higher decoding priority to said shifted at least one bit plane.

2. The adaptive quantization controller set forth in claim 1 wherein said at least one bit plane comprises an N×M block of said enhancement layer video data.

3. The adaptive quantization controller set forth in claim 2 wherein said adaptive quantization controller modifies said data field to include said shifting factor and a mode indicator indicating that said shifting factor corresponds to said N×M block of said enhancement layer video data.

4. The adaptive quantization controller set forth in claim 3 wherein said shifting factor is in the range from 0 to 2 bit planes.

5. The adaptive quantization controller set forth in claim 1 wherein said at least one bit plane comprises a plurality of related N×M blocks of said enhancement layer video data.

6. The adaptive quantization controller set forth in claim 5 wherein said adaptive quantization controller modifies said data field to include said shifting factor and a mode indicator indicating that said shifting factor corresponds to said plurality of N×M blocks of said enhancement layer video data.

7. The adaptive quantization controller set forth in claim 6 wherein said shifting factor is in the range from 0 to 7 bit planes.

8. The adaptive quantization controller set forth in claim 1 wherein said adaptive quantization controller modifies said data field to include a mode indicator indicating that no bit plane associated with said enhancement layer video data is being shifted.

9. A video encoder comprising:
  a base layer circuit capable of receiving an input stream of video frames and gene rating therefrom compressed base layer video frames suitable for transmission to a streaming video receiver;
  an enhancement layer circuit capable of receiving said input stream of video frames and a decoded version of said compressed base layer video frames and performing bit-plane coding to generate therefrom enhancement layer video data associated with, and allocated to, corresponding ones of said compressed base layer video frames; and
  an adaptive quantization controller capable of receiving at least one quantization parameter from said base layer circuit and, in response thereto, determining a corresponding shifting factor for shifting at least one bit plane associated with said enhancement layer video data and modifying a data field in said enhancement layer video data to cause said video streaming receiver to assign a higher decoding priority to said shifted at least one bit plane.

10. The video encoder set forth in claim 9 wherein said at least one bit plane comprises an N×M block of said enhancement layer video data and said adaptive quantization controller modifies said data field to include said shifting factor and a mode indicator indicating that said shifting factor corresponds to said N×M block of said enhancement layer video data.

11. The video encoder set forth in claim 9 wherein said at least one bit plane comprises a plurality of related N×M blocks of said enhancement layer video data and said adaptive quantization controller modifies said data field to include said shifting factor and a mode indicator indicating that said shifting factor corresponds to said plurality of N×M blocks of said enhancement layer video data.

12. The video encoder set forth in claim 9 wherein said adaptive quantization controller modifies said data field to include a mode indicator indicating that no bit plane associated with said enhancement layer video data is being shifted.

13. A video decoder comprising processing circuitry capable of receiving from a streaming video transmitter a streaming video signal comprising compressed base layer video frames and enhancement layer video previously bit-plane coded data associated with, and allocated to, corresponding ones of said compressed base layer video frames, wherein said processing circuitry is further capable of detecting in said streaming video signal a data field for shifting at least one bit plane associated with said enhancement layer video data and, in response to said detection, assigning a higher decoding priority to said shifted at least one bit plane.

14. The video decoder set forth in claim 13 wherein said at least one bit plane comprises an N×M block of said enhancement layer video data and said data filed comprises a shifting factor and a mode indicator indicating that said shifting factor corresponds to said N×M block of said enhancement layer video data.

15. The video decoder set forth in claim 13 wherein said at least one bit plane comprises a plurality of related N×M blocks of said enhancement layer video data and said data field comprises a shifting factor and a mode indicator indicating that said shifting factor corresponds to said plurality of N×M blocks of said enhancement layer video data.

16. The video decoder set forth in claim 13 wherein said data field comprises a mode indicator indicating that no bit plane associated with said enhancement layer video data is being shifted.

17. For use in a video encoder comprising: 1) a base layer circuit capable of receiving an input stream of video frames and generating therefrom compressed base layer video frames suitable for transmission to a streaming video receiver, and 2) an enhancement layer circuit capable of receiving the input stream of video frames and a decoded version of the compressed base layer video frames and performing bit-plane coding to generate therefrom enhancement layer video data associated with, and allocated to, corresponding ones of the compressed base layer video frames, a method of modifying an allocation of the enhancement layer video data among the corresponding ones of the compressed base layer video frames, the method comprising the steps of:
  receiving at least one quantization parameter from the base layer circuit;
  determining a corresponding shifting factor for shifting at least one bit plane associated with the enhancement layer video data; and
  modifying a data field in the enhancement layer video data to cause the video streaming receiver to assign a higher decoding priority to the shifted at least one bit plane.

18. The method set forth in claim 17 wherein the at least one bit plane comprises an N×M block of the enhancement layer video data.

19. The method set forth in claim 18 wherein the adaptive quantization controller modifies the data field to include the shifting factor and a mode indicator indicating that the shifting factor corresponds to the N×M block of the enhancement layer video data.

20. The method set forth in claim 19 wherein the shifting factor is in the range from 0 to 2 bit planes.

21. The method set forth in claim 17 wherein the at least one bit plane comprises a plurality of related N×M blocks of the enhancement layer video data.

22. The method set forth in claim 21 wherein the adaptive quantization controller modifies the data field to include the shifting factor and a mode indicator indicating that the shifting factor corresponds to the plurality of N×M blocks of the enhancement layer video data.

23. The method set forth in claim 22 wherein the shifting factor is in the range from 0 to 7 bit planes.

24. The method set forth in claim 17 wherein the adaptive quantization controller modifies the data field to include a mode indicator indicating that no bit plane associated with the enhancement layer video data is being shifted.

* * * * *